Patented Oct. 10, 1939

2,175,811

UNITED STATES PATENT OFFICE 2,175,811

MANUFACTURE OF KETENES

Donald J. Loder, Wilmington, Del., assignor to E. I. du Pont de Nemours & Company, Wilmington, Del., a corporation of Delaware No Drawing. Application October 28, 1936, Serial No. 108,005

19 Claims. (Cl. 260—550)

This invention relates to a process for the manufacture of ketenes and more particularly to a process for the manufacture of ketenes by the thermal decomposition of aliphatic carboxylic acid esters.

The industrial pyrolysis of acetone to acetic anhydride and ketene is well known, as well as the similar treatment of acetaldehyde and alkyl ketones generally to produce ketene or substituted ketenes. These processes, however, have not been attractive from the commercial standpoint for the primary reason that the raw materials have been obtainable only at high cost and the ketenes produced therefrom only in uneconomical yield.

An object of the present invention is to provide a process for the preparation of ketenes by the thermal decomposition of organic esters. Another object of the invention is to provide a process wherein ketenes generally, such, for example, as ketene, methyl ketene, diethyl ketene, and the like, may be prepared by dehydroalkoxylating appropriate esters of the carboxylic acids. A more specific object is to provide a process for the preparation of ketene by thermally decomposing methyl acetate. A still more specific object is to provide a process wherein methyl acetate is passed at elevated temperatures and subatmospheric pressures over a catalyst which accelerates the thermal decomposition of the ester into ketene and methanol. Other objects of the invention will hereinafter appear.

The above objects are realized by subjecting in the vapor phase an aliphatic carboxylic acid ester to comparatively high temperatures and preferably pressures somewhat lower than atmospheric. With these conditions, under which the reaction is preferably accelerated in the presence of a suitable catalyst, the ester is decomposed to give ketene and an alcohol. In many instances, owing to the high reactivity of the ketene, it may react with the products formed, such as, water and the alcohol produced, to give, in addition to the ketene and alcohol, acids and anhydrides. In order, however, to control the direction of the reaction and obtain the desired product, namely, ketene, various expedients are resorted to which will be more fully described hereinafter.

When reference is made to dehydroalkoxylating, dehydromethoxylating, and the like, in the specification and claims appended hereto, it will be understood that these terms will connote the removal from the ester of an alkoxy group and hydrogen or a methoxy group and hydrogen, respectively. These terms are used since the mechanism of the reaction appears to be, in most instances, that as the ester decomposes an alcohol is split off leaving the ketene or substituted ketene.

The esters which may be used in the process of the present invention are primarily the aliphatic monocarboxylic acid esters of the aliphatic monohydric alcohols, such, for example, as methyl acetate, ethyl acetate, propyl acetate, isobutyl acetate, and the higher esters of acetic acid with straight or branched chain aliphatic saturated or unsaturated alcohols, of these esters methyl acetate decomposes to ketene and methanol much more readily and efficiently than do the higher ester to their corresponding products. Not only can esters of acetic acid be thermally decomposed in accord with the process of this invention to give ketene, but likewise the higher aliphatic acid esters may be treated to give substituted ketenes. For example, when methyl propionate is dehydromethoxylated, a methyl ketene and methanol will be the major products; when ethyl isobutyrate is dehydroethoxylated, dimethyl ketene and ethanol will be the major reaction products. Accordingly, in a substantially analogous manner, other substituted ketenes may be produced from the higher monocarboxylic acid esters of the straight or branched chain type alcohols. Generally speaking the methyl esters of the higher acid ester acylates give the substituted ketenes and alcohols more readily than do the higher alkyl esters of the corresponding acids. While usually the monocarboxylic acid esters may be thermally decomposed to ketenes much more readily than polycarboxylic acid esters, nevertheless, the latter type esters, and more particularly the di and tricarboxylic acid esters, can be treated in accord with the process herein described to produce valuable compounds.

The process is preferably conducted in the vapor phase, the ester is vaporized either prior to or during the reaction, and is thermally decomposed at a temperature of from approximately 500 to 1000° C. and preferably from 650–800° C. in the presence of a suitable type catalyst, such, for example, as sodium meta phosphate, silica gel or silica gel supporting a suitable promoter such as phosphoric acid or hydrated or anhydrous boron oxide and like dehydrating catalysts.

It has been found that the reaction proceeds, particularly when methyl acetate is being thermally decomposed to ketene, at subatmospheric pressures preferably ranging between 10 and 700 mm., with space velocities ranging between 500 and 10,000 under these pressures. (The space velocity is the number of unit volumes of gas, at standard conditions, passing per hour through a unit volume of the catalyst.)

In order to inhibit the decomposition of the ester of valueless by-products the presence of water vapor has proved to be remarkably effective. For example, if amounts of up to 8% are introduced with the ester, it has been found that while the yields of ketene continue to be high, a much larger part of the ester decomposed in the absence of water vapor is converted to a usable product, namely, the acid corresponding to the ester used. Higher amounts are not usually advisable because of greater dilution of the product.

Catalyst, temperatures, and space velocity are more or less interdependent, that is, to avoid undue decomposition, an increase of temperature requires, for optimum results, a like increase in space velocity. As is usual in chemical reactions the higher the temperature the more favorable the reaction rate, and accordingly in this reaction also when high temperatures are employed, in which reaction rates are high, comparatively high space velocities should be employed. It has been found that to limit side reactions it is advisable to operate at diminished pressures, and pressures around 100 mm. of mercury or lower have generally produced optimum operating conditions, although at higher pressures decreased yield of ketene is partially compensated for by increased conversion to the acid corresponding to the ester treated.

I shall now describe by way of examples methods for carrying into practice my invention but it will be understood that the details therein given will not limit in any way the scope of the invention.

Example I

Into a copper lined catalyst tube maintained at a temperature between 506 and 631° C., 1.15 mols of methyl acetate was injected at a space velocity of approximately 1400. The catalyst tube was filled with a silica gel catalyst supporting boric acid. This catalyst was prepared by adding 100 parts of silica gel to 200 parts of boiling water containing 40 parts of boric acid, separating and drying the solid material. A pressure of approximately 114 mm. was maintained throughout the reaction and a yield of approximately 86.5% ketene was obtained.

Example II

A copper lined catalyst tube was filled with silica gel and into it 1.13 mols of methyl acetate was injected at a space velocity of approximately 1,680. The catalyst chamber was maintained at a temperature between 507 and 530° C. with a pressure of approximately 170 mm. A yield of approximately 64% ketene was realized. The yields are calculated on a molal basis as a percentage of that theoretically obtainable.

Example III

Into a catalyst tube containing boric acid or silica gel approximately 1.14 mols of liquid methyl acetate was injected at a space velocity of 2,040. The converter was maintained at a temperature of between approximately 525 and 635° C. and the pressure within the converter at approximately 180 mm. Approximately 87.8% yield of ketene was found.

Example IV

Methyl ketene was obtained by charging a copper lined catalyst converter with a silica gel catalyst, and approximately 1.03 mols of methyl propionate were passed through the converter at a space velocity of approximately 1,500. The converter was maintained at a temperature ranging between 500 and 650° C. and the pressure within the converter at approximately 90 mm.

Example V

Into a copper converter containing no catalyst approximately 0.315 mol of liquid methyl acetate was injected. The converter was held at a temperature of approximately 763° C. and its contents at approximately 28 mm. pressure. A 21.5% yield of ketene was obtained.

Various methods may be employed for recovery of the ketene, e. g., compressing the gaseous products and scrubbing the thus compressed products with acetone or methyl acetate or if desired the ketene may be absorbed, without the necessity of the compression step, directly in acetic acid.

From a consideration of the above specification it will be appreciated that many changes may be made in the details therein given without departing from the invention or sacrificing any of the advantages that may be derived therefrom.

I claim:
1. A process for the preparation of a ketene which comprises thermally decomposing, in the vapor phase, a lower alkyl ester of a lower aliphatic monocarboxylic acid at a temperature ranging between approximately 500 and approximately 1000° C.
2. The process according to claim 1 conducted under pressures lower than atmospheric.
3. The process according to claim 1 conducted by contacting the ester of the aliphatic carboxylic acid with a silica gel catalyst.
4. The process according to claim 1 in which the ester of the aliphatic carboxylic acid is contacted with boric oxide supported on silica gel.
5. A process for the preparation of ketene which comprises thermally decomposing, in the vapor phase, a methyl ester of a mono-basic lower aliphatic acid at a temperature between approximately 500 and approximately 1000° C.
6. A process for the preparation of ketene which comprises thermally decomposing, in the vapor phase, a methyl ester of a fatty acid at a temperature between 500 and 1000° C., a pressure of less than one atmosphere and in the presence of silica gel as the catalyst.
7. A process for the preparation of ketene which comprises thermally decomposing, in the vapor phase, methyl acetate at a temperature between approximately 500 and approximately 1000° C.
8. A process for the preparation of ketene which comprises thermally decomposing, in the vapor phase, methyl acetate in the presence of a silica gel catalyst.
9. A process for the preparation of methyl ketene which comprises thermally decomposing, in the vapor phase, methyl propionate at a temperature of approximately 500 and approximately 1000° C.
10. A process for the preparation of methyl ketene which comprises thermally decomposing, in the vapor phase, methyl propionate in the presence of a silica gel catalyst.
11. A process for the preparation of ketene which comprises thermally decomposing, in the vapor phase, an ester of an aliphatic carboxylic acid by contacting it with a dehydrating catalyst.

12. A process for the preparation of ketene which comprises contacting methyl acetate with a silica gel catalyst at a temperature of from 500 to 1000° C., under a pressure of from 10 to 700 mm. and a space velocity of 500 to 10,000.

13. A process for the preparation of ketene which comprises contacting methyl acetate with a silica gel catalyst promoted with boric oxide at a temperature ranging between 650 and 800° C.

14. The process of claim 13 conducted under a pressure ranging between 10 and 700 mm.

15. The process of claim 13 conducted at a space velocity ranging between 1,000 and 10,000.

16. The process of claim 1 conducted in the presence of water vapor.

17. The process of claim 13 conducted in the presence of water vapor.

18. A process for the preparation of ketene which comprises thermally decomposing methyl acetate in the presence of from 2 to 8% water vapor based on the ketene present at a temperature ranging between 500 and 1000° C.

19. A process for the preparation of ketene which comprises contacting methyl acetate with a silica gel catalyst promoted with boric oxide at a temperature ranging between 506 and 631° C., a pressure of approximately 114 mm. and a space velocity of approximately 1400.

DONALD J. LODER.